United States Patent [19]

Frihart

[11] Patent Number: 5,296,556
[45] Date of Patent: Mar. 22, 1994

[54] THREE-COMPONENT CURABLE RESIN COMPOSITIONS

[75] Inventor: Charles R. Frihart, Lawrenceville, N.J.

[73] Assignee: Union Camp Corporation, Princeton, N.J.

[21] Appl. No.: 743,050

[22] Filed: Aug. 9, 1991

Related U.S. Application Data

[63] Continuation-in-part of Ser. No. 606,793, Oct. 30, 1990, abandoned.

[51] Int. Cl.$^5$ ............... C08F 283/04; C08G 69/48
[52] U.S. Cl. ................... 525/420.5; 525/423
[58] Field of Search ................... 525/420.5, 423

[56] References Cited

U.S. PATENT DOCUMENTS

| 4,082,708 | 4/1978 | Mehta | 525/423 |
| 4,128,525 | 12/1978 | Yeakey et al. | 525/423 |
| 4,732,966 | 3/1988 | Wilson | 525/420.5 |
| 4,914,162 | 4/1990 | Leoni et al. | 525/420.5 |
| 5,155,177 | 10/1992 | Frihart | 525/420 |

Primary Examiner—John C. Bleutge
Assistant Examiner—Helen F. Lee
Attorney, Agent, or Firm—Woodcock Washburn Kurtz Mackiewicz & Norris

[57] ABSTRACT

An improved thermoset adhesive composition comprising a thermoplastic, substantially amine-terminated polyamide resin, an epoxy resin, and a diluent, and methods for the preparation thereof.

17 Claims, No Drawings

THREE-COMPONENT CURABLE RESIN COMPOSITIONS

This is a continuation-in-part application of pending application Ser. No. 07/606,793, filed Oct. 30, 1990, now abandoned.

FIELD OF THE INVENTION

This invention relates to new and improved amine-terminated polyamide/epoxy resin compositions useful as curable hot-melt adhesives, which compositions contain a diluent which reduces the polyamide melt viscosity without adversely affecting the composition strength. This invention further relates to the process of manufacture of the hot-melt adhesives.

DESCRIPTION OF RELATED ART

U.S. Pat. No. 2,705,223 (Renfrew et al.) relates to the curing of mixtures of polyamide resins and complex epoxides. The polyamides comprise the condensation products of polymeric fatty acids with aliphatic polyamines. Compositions varying from 10% epoxy resin and 90% polyamide resin to 90% epoxy resin and 10% polyamide resin are disclosed. The emphasis was on higher amine number polyamides and the use of those resins for coatings.

U.S. Pat. No. 4,082,708 (Mehta) discloses bisamino piperazine containing thermoplastic polyamides which are reacted with epoxides to provide a quick set hot-melt composition. The polyamide is derived substantially from bisamino piperazine.

U.S. Pat. No. 2,867,592 (Morris et al.) disclose thermoplastic polyamide epoxy adhesives prepared from polymeric fatty acids. The materials of Morris are limited in epoxy content and are not thermoset.

U.S. Pat. No. 3,488,665 (MacGrandle, et al.) teaches a process wherein polyamides are blended with epoxies to provide a product which cures after reaction with another polyamide. Example 1 in the patent implies that excess epoxy resin with acid-terminated polyamides reacts only to a limited extent when heated. We have found that these mixtures continue to cure when heated, implying that one of the components in the mixture is not stable.

Two component thermosettable epoxy adhesive compositions thus are well known, as are the curable liquid epoxides and liquid polyamide curing agents. It is also well known in the art that relatively high amine number and medium molecular weight polyamides can be reacted with epoxy resins to form thermoset systems with reasonable flexibility, impact resistance, and tensile shear strength. The reaction, however, is often very slow. The reaction rate can be increased by using relatively lower molecular weight and higher amine number polyamides; however, when reacted with epoxy resins, the resultant thermoset generally lacks the desirable flexible qualities of the materials made from higher molecular weight polyamides. Also, these materials are liquids, and therefore have little green (initial) strength until cured.

In U.S. Pat. application Ser. No. 479,830 (filed Feb. 14, 1990) and corresponding to European Application No. EP-A-442700, Frihart and Gordon disclose that good green and cured strength, as well as flexibility, can be obtained by reacting high molecular weight, low amine number hot-melt polyamides with low levels of epoxies.

It is desirable to provide for improved mixing of the polyamide (3,000–5,000 cps at 190° C.) and epoxy resins (200–400 cps at 190° C.) prior to curing in a hot-melt thermosetting system. One method of accomplishing this is to use a lower molecular weight polyamide to minimize the differential viscosity between the polyamide and epoxy components. Unfortunately, however, the lower molecular weight polyamides, while serving the purpose of reducing the viscosity, also pose additional problems in a hot-melt thermoset system. If a lower molecular weight polyamide with a relatively low amine number is used, the resultant adhesive system does not possess adequate initial adhesive strength quality, known to those skilled in the art as green strength, for adhesive systems. If a higher amine number polyamide which has a similar lower molecular weight is used to improve the green strength, the resultant adhesive tends to cure too quickly, and thus is not conducive to hot-melt thermoset adhesive systems.

There exists, then, a need for a hot-melt thermoset adhesive composition which provides for improved mixing of the polyamide and epoxy resins prior to curing without adversely affecting the strength properties of the adhesive.

SUMMARY OF THE INVENTION

It has now been found that the addition of a controlled amount of a diluent to a polyamide resin permits the reduction in the melt viscosity of the polyamide resin, thereby allowing use of a lower viscosity polyamide in a hot-melt, thermoset adhesive composition without sacrificing physical properties of the adhesive composition such as green strength and cured strength.

The present invention provides an improved thermosetting adhesive composition comprising a thermoplastic, substantially amine-terminated polyamide, a diluent, and an epoxy resin, wherein the epoxy resin has at least two epoxy groups per molecule of epoxy resin; the polyamide has an amine number greater than about 1 and less than about 50 and has an excess of amine groups to acid groups; and the diluent contains a polar group and has a molecular weight effective to reduce the melt viscosity of the polyamide resin without adversely affecting the strength of the thermoset adhesive composition. The diluent provides for improved mixing of the polyamide and epoxy prior to curing of the thermoset adhesive composition.

DETAILED DESCRIPTION OF THE INVENTION

The invention pertains to an improved thermoset adhesive composition comprising a thermoplastic, substantially amine-terminated polyamide, an epoxy and a diluent. The polyamide resin has an amine plus acid number greater than about 1 and less than about 50 and also has an excess of amine groups to acid groups. The epoxy resin has at least two epoxy groups per molecule of epoxy resin. The initial ratio of epoxy groups to total free amine groups is greater than about 1:1 and less than about 10:1. Thus, each free amine group becomes reacted with an epoxy group, thereby linking the polyamide chains into the epoxy network.

The compositions of the invention, most broadly, can be made using any thermoplastic aminoamide polymer. In preferred compositions of the present invention, the polyamide should have an amine plus acid number greater than about 1 and less than about 50 and also have an excess of amine to acid groups. More preferably, the polyamide should have an amine plus acid number greater than about 2 and less than about 30 and most preferably, less than about 20, (the amine functionality is expressed in a conventional manner in terms of mg. of equivalent KOH/g of sample.) Preferably, the number of amine groups of the polyamide resin should be from about 51% to 99% of the total number of acid and amine groups. With lower functionality, the groups are too dispersed to cure sufficiently. With higher functionality, there is risk of premature gelation or at least excessive viscosity. For better green strength, the polyamides should also have a softening point above about 50° C., preferably between about 75° C. to about 200° C.

In preferred compositions of the present invention, the polyamides are made from polymerized fatty acids; linear dicarboxylic acids; and linear, branched, or cyclic polyamines or mixtures thereof. As used herein, "polymerized fatty acids" refers to those acids known commercially as "dimer acid", or to non-linear dicarboxylic acid, especially non-linear dicarboxylic acids having 21 to 44 carbon atoms. A monocarboxylic acid may be added in order to change the ratio of amine to acid groups, and/or to control the molecular weight of the polyamide.

The polyamide compositions of the invention can be made using 30–100 percent equivalent (i.e., 30–100% of the total acid groups present in the mixture before polymerization are derived from the dimer component) of any polymerized, unsaturated fatty acid or the reaction product of an acrylic acid with unsaturated fatty acids. Preferably, the polyamide compositions are made using 50–90 equivalent percent of the polymerized fatty acid. Most preferable is a polymerized, unsaturated fatty acid having a dimeric fatty acid content greater than about 65 percent by weight.

The term "dimer acid" refers to polymeric or oligomeric fatty acids typically made by addition polymerization of unsaturated tall oil fatty acids. These polymeric fatty acids typically have the composition 0–10% $C_{18}$ monobasic acids, 60–95% $C_{36}$ dibasic acids, and 1–35% $C_{54}$ tribasic and higher polymeric acids. The relative ratios of monomer, dimer, trimer and higher polymers in unfractionated "dimer acid" are dependent on the nature of the starting material and the conditions of polymerization and distillation. Methods for the polymerization of unsaturated fatty acids are described, for example, in U.S. Pat. No. 3,157,681. The dimer content is also controlled by the fractionation conditions used to reduce the monomer, trimer and higher polymer components.

Linear dicarboxylic acids may be added in amounts up to about 70 equivalent percent, preferably 10–50 equivalent percent, and have from 6 to about 22 carbon atoms. Preferred linear dicarboxylic acids include oxalic, malonic, succinic and suberic acids. More preferred are adipic, azelaic, sebacic and dodecanedioic acids.

Monocarboxylic acids may be added in amounts up to about 10 equivalent percent to control molecular weight. Preferred monocarboxylic acids are linear and have 2 to 22 carbon atoms. Most preferred are stearic, tall oil fatty and oleic acids.

Linear, branched, or cyclic polyamines, or mixtures thereof are added in amounts of from about 100 equivalent percent up to about 120 equivalent percent, based upon total acid groups added to the polymerization, more preferably from about 100 equivalent percent up to about 115 equivalent percent, and have from 2 to 60 carbon atoms. The polyamines are mainly diamines. Preferred aliphatic polyamines include ethylenediamine, diaminopropane, diaminobutane, diaminopentane, hexamethylenediamine, methylpentamethylenediamine, methylnonanediamine, piperazine, dipiperazine, aminoethylpiperazine, bis(aminoethyl)piperazine, bis(aminomethyl)cyclohexane, and dimer diamine (diamine made from dimer acid). Xylenediamine and bis(aminomethyl)benzene are also useful. Most preferred are ethylenediamine, hexamethylenediamine, piperazine, methylpentamethylenediamine, dimer diamine, and polyetherdiamines.

Polyetherdiamines provide products with better flow properties. Polyetherdiamines are added in amounts of from 2 to 60 equivalent percent, and more preferably from 5 to 40 equivalent percent. The most preferred polyetherdiamines include diamines made from propylene oxide polymers having molecular weights of from 100 to about 8000, diamines made from ethylene oxide polymers having molecular weights of from 100 to about 8000, and diamines made from ethylene oxide-propylene oxide polymers having molecular weights of from 100 to about 8000. Other suitable polyetherdiamines include triamines made from propylene oxide polymers or ethylene oxide polymers and having molecular weights of from 100 to about 8000. Typical commercial products are Jeffamine™ D-230, D-400, D-4000, ED-600, ED-900, ED-2001, ED-4000, ED-6000, T-403, and ER-148 (Texaco Chemical Company, Bellaire, Tex.).

Monoamines may also be added in an amount up to 10 equivalent percent to control molecular weight and functionality. Up to about 30 equivalent percent of higher polyamines such as diethylenetriamine, triethylenetetraamine, and tetraethylenepentaamine, may be used. Mixtures of polyamines can also be used to obtain a good balance of properties.

Methods for preparing the polyamides used in the adhesive compositions of the present invention are generally known in the art and are exemplified in the appended examples. Suitable polyamides are commercially available; for example, UNI-REZ™ 2636, 2643, 2646, 2648, 2654, and 2656 (Union Camp Corporation, Wayne, N.J.)

The diluent comprises a polar group and has a molecular weight which is sufficiently high to maintain the volatility at a level such that the diluent can be used in a hot-melt adhesive application without "boiling off". The molecular weight must be low enough to reduce the melt viscosity of the polyamide resin in the hot-melt adhesive composition. Preferably the molecular weight of the diluent will be from about 200 to 900. The boiling point of the diluent will preferably be greater than 290° C. The weight ratio of polyamide to diluent is from about 100:1 to about 4:1, preferably from about 35:1 to about 6:1.

Generally, any amine, amide, ester, ether, or sulfide which has the requisite characteristics of molecular weight and boiling point and which acts to reduce the viscosity of the polyamide resin without adversely affecting the physical strength properties of the adhesive composition may be used. Preferably the diluent will be selected from the group consisting of $RNH_2$, $RNHCH_2CH_2CH_2NH_2$ and R-X-R'; wherein R and R' are any $C_{14}$–$C_{24}$ aliphatic hydrocarbons, and X is selected from the group consisting of

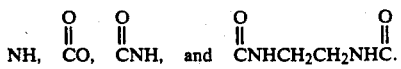

Preferred amine diluents are tallowamine, ditallowamine, and di(hydrogenatedtallow)amine. Diamines such as tallowaminopropylamine and dimer diamine are also useful as diluents. Both primary and secondary amines may be used as diluents. Generally, monoamines are preferred over diamines. Most preferably, secondary monoamines, such as ditallowamines, are used. Preferred amides which may be used include stearyl stearamide and ethylene bisstearamide. By way of example, stearyl stearate is a preferred ester used in adhesive compositions of the present invention.

The present invention is applicable to epoxy resins having two or more epoxy groups per molecule of epoxy resin. The most preferred epoxy resins have from 2.2 to 8 epoxy groups per molecule. The epoxy compositions which may be used for curing are generally linear epoxies based upon the diglycidyl ether of bisphenol A or bisphenol A oligomers, or branched types based upon the multiglycidyl ethers of phenolformaldehyde or cresol-formaldehyde resins, or epoxidized olefins, including unsaturated fatty oils. The most preferred epoxy resins are multifunctional epoxy novalac resins, such as the D.E.N. ™ epoxy novalac resins sold by the Dow Chemical Company (Midland, Mich.). D.E.N. 431 has an average of 2.2 epoxy groups per molecule, D.E.N. 438 has an average functionality of 3.6, and D.E.N. 439 resin has It is preferred that the initial ratio of epoxy groups of the epoxy resin to free amine groups be greater than about 1:1 and less than about 10:1. It is more preferred that the ratio of epoxy groups to free amine groups be greater than about 1:1 and less than about 5:1. The most preferred ratio of epoxy groups to free amine groups is greater than about 1.5:1 and less than about 5:1.

The application and curing of the diluent-polyamide-epoxy resin composition is effected very simply. The polyamide resin, diluent, and epoxy resin may be melted separately, subsequently mixed together and then coated upon the substrate as a molten mixture. The molten polyamide resin, molten diluent and molten epoxy resin may be combined simultaneously. Preferably, the molten polyamide resin and molten diluent are mixed together to form a molten mixture of the two. The molten mixture is then combined with the molten epoxy to form the thermoset adhesive composition. Alternatively, the polyamide resin may be dry-blended with the diluent and melted when needed to combine with the molten epoxy resin. The reaction temperature will generally not exceed 220° C., since at higher temperatures some cracking or premature polymerization of the reaction product will occur. Of course, a coating of the molten thermoset adhesive composition may be applied upon any or all areas or surfaces of one or more substrates.

The resultant product, after application and upon cooling, is a thermoset having good initial adhesive strength at room temperature, commonly referred to as green strength. The term thermoset, as used herein, denotes a material that either will undergo or has undergone a chemical reaction by the action of heat, catalysts, ultraviolet light or other means, leading to a relatively infusible state. Upon curing, the thermoset adhesive composition demonstrates improved organic solvent resistivity, water resistivity and heat resistivity. This thermoset adhesive is more ductile and flexible, provides longer working times, and will bond to most plastics. In addition, the thermoset adhesive compositions provide improved bonding to substrates at ambient temperatures and substrates having smooth surfaces, both of which are generally more difficult to bond.

It will be evident to one skilled in the art of adhesive formulation that other additives such as fillers, reinforcing agents, coupling agents, colorants, odorants, other comonomers, resins, tackifiers, plasticizers, lubricants, stabilizers, antistats, and the like can optionally be added. In addition, antioxidants can be added at any point during the reaction sequence.

The invention will be made clearer by reference to the following examples. These examples are presented for the purpose of illustration and to further set forth the best mode of carrying out the invention. These examples are not to be construed as limiting the appended claims.

Examination of the following examples and review of the resulting data will make two points particularly apparent. First, addition of the diluent to the polyamide, thereby reducing the viscosity of the polyamide prior to mixing with the epoxy, while adversely affecting the physical properties of the uncured polyamide resin (Example 1(a) v. 1(b)), does not cause significant loss of physical properties of the cured, thermoset adhesive composition, such as vinyl T-peel, lap shear strength, or tensile at ambient or 60° C. Secondly, in relationship to a polyamide-epoxy thermoset made with a lower viscosity polyamide to which a diluent has been added, a polyamide-epoxy thermoset made from the lower viscosity polyamide without the diluent is significantly weaker in all of these properties.

EXAMPLE 1(a)

Control; Uncured Polyamide

Example 1 is a control sample of an uncured, amine-terminated polyamide, UNI-REZ ™ 2636 (Union Camp Corp., Wayne, N.J.), which is prepared commercially from dimer acid, co-diacid, ethylenediamine, piperazine, and polyetherdiamine. This polyamide had an acid number of 0.6 and an amine number of 7.6. The viscosity of the polyamide was measured at 190° C., and the softening point was determined by standard ASTM ring and ball softening point methods, results of which are found in Table 2.

Fifty grams of UNI-REZ 2636 were placed into a metal container. The metal container was put into an oven preheated to a temperature of 190° C. The container was removed when the polyamide became molten. The resulting molten polyamide was poured onto release paper and allowed to cool. Tensile samples were prepared according to methods outlined in Example 2 and tensile tests were conducted at 23° C. after 24-hour storage at 23° C. and 50% humidity, and at 60° C. after 24-hour storage in 60° C. water (Table 3).

EXAMPLE 1(b)

Comparative; Uncured Polyamide with Ditallowamine

Fifty grams of UNI-REZ 2636 were placed into a metal container and 10 weight percent (based on the polyamide resin) of ditallowamine (Sherex A-240) were added to the UNI-REZ 2636. The metal container was put into an oven preheated to a temperature of 190° C. The metal container was removed when the polyamide/diluent mixture became molten. The resulting molten mixture was poured onto release paper and allowed to cool. Tensile tests were conducted according to conditions outlined in Example 1 (Table 3).

EXAMPLE 2

Epoxy-Cured Polyamide

Fifty grams of UNI-REZ 2636 were placed into a metal container. The metal container was put into an oven preheated to a temperature of 190° C. The container was removed when the polyamide became molten. Five grams of epoxy resin (D.E.N. 439) were immediately and thoroughly mixed into the polyamide. The resulting molten mixture was poured onto release paper and allowed to cool.

Upon solidification, 27 grams of the mixture were placed into a Carver laboratory press apparatus. The solidified mixture was pressed at 3000 psi and 100° C. for two hours in order to obtain an accelerated cure. Alternatively, the solidified mixture may be pressed for 5 minutes at 3000 psi and 100° C. and then allowed to cure at room temperature for at least one week. The pressed, cured product was of uniform thickness and was stamped using a mallet and die to obtain samples for tensile tests.

Tensile samples were tested at 23° C. after 24-hour storage at 23° C. and 50% humidity, and at 60° C. after 24-hour storage in 60° C. water (Table 3). The gel time was determined to be that time at which the viscosity of the polyamide/epoxy resin mixture reached a viscosity of 100,000 cps, as measured by a Brookfield RVTD viscometer (Table 2).

EXAMPLE 3

Epoxy-Cured, Low Viscosity Polyamide

An amine-terminated polyamide was produced by combining the following ingredients in a resin kettle: a polymerized fatty acid at 68.9 equivalent percent; azelaic acid at 28 equivalent percent; stearic acid at 2.7 equivalent percent; ethylenediamine at 35 equivalent percent; anhydrous piperazine at 57.2 equivalent percent; diethylenetriamine at 10 equivalent percent; and Jeffamine TM D-2000 at 6.1 equivalent percent. Antioxidants were added at 1.0 weight percent and about 6 drops of phosphoric acid catalyst were added.

A nitrogen inlet, baret trap, condenser, and thermocouple were attached to the kettle head. This system was stirred and heated gradually to approximately 250° C. for about three hours. Once most of the water had distilled over, the baret trap and condenser were removed and vacuum was applied. The system was kept at a constant temperature of about 250° C. under vacuum for another three hours. The vacuum pressure was then released and the polyamide was poured onto release paper to cool.

The resulting polyamide had an acid number of 0.8 and an amine number of 10.7. The viscosity and softening point of the uncured polyamide were determined according to the method of Example 1 (Table 2). The polyamide was treated and tested according to the methods followed in Example 2 (Table 2 and Table 3).

EXAMPLE 4

Epoxy-Cured Polyamide with Tallowamine

The procedure of Example 2 was followed, with the exception that varying amounts of tallowamine (Kemamine P-970) were added to the polyamide prior to placing the metal container into the pre-heated oven. Formulations for samples 4(a) through 4(c) may be found in Table 1, wherein the weight percents of the epoxy resin (D.E.N. 439) and the tallowamine (Kemamine P-970) are based on the weight of the polyamide resin. Gel times may be found in Table 2, while the results of the tensile testing are found in Table 3.

EXAMPLE 5

Epoxy-Cured Polyamide with Tallowamine and Tallowaminopropylamine

The procedure of Example 2 was followed, with the exception that varying amounts of tallowamine (Kemamine P-970) and tallowaminopropylamine (Kemamine D-999) were added to the polyamide resin prior to placing the metal container in the pre-heated oven. Formulations for samples 5(a) and 5(b) may be found in Table 1, wherein the weight percents of the epoxy resin (D.E.N. 439), tallowaminopropylamine (Kemamine D-999), and tallowamine (Kemamine P-970) are based on the weight of the polyamide resin. Gel times may be found in Table 2, while the results of the tensile testing are found in Table 3.

EXAMPLE 6

Epoxy-Cured Polyamide with Ditallowamine

The procedure of Example 2 was followed, with the exception that varying amounts of ditallowamine (Sherex A-240) were added to the polyamide prior to placing the metal container into the pre-heated oven. Formulations for samples 6(a) through 6(c) may be found in Table 1, wherein the weight percents of the epoxy resin (D.E.N. 439) and the ditallowamines (Sherex A-240) are based on the weight of the polyamide resin. Gel times may be found in Table 2, while the results of the tensile testing are found in Table 3.

TABLE 1

| | | FORMULATION | | | |
|---|---|---|---|---|---|
| Example | Polyamide (g) | DEN 439[1] Wt. %[5] | P-970[2] Wt. %[5] | D-999[3] Wt. %[5] | A-240[4] Wt. %[5] |
| 1 | 50[6] | — | — | — | — |
| 2 | 50[6] | 10 | — | — | — |
| 3 | 50[7] | 10 | — | — | — |
| 4(a) | 50[6] | 13 | 5 | — | — |
| 4(b) | 50[6] | 16 | 10 | — | — |
| 4(c) | 50[6] | 19 | 15 | — | — |
| 5(a) | 50[6] | 18.5 | 10 | 2.5 | — |
| 5(b) | 50[6] | 21 | 10 | 5.0 | — |
| 6(a) | 50[6] | 12 | — | — | 5 |
| 6(b) | 50[6] | 14 | — | — | 10 |
| 6(c) | 50[6] | 16 | — | — | 15 |

[1]D.E.N. TM 439: Epoxy Resin (Dow Chemical Co., Midland, MI)
[2]Kemamine TM P-970: Tallowamine (Humko Chemical Co., Memphis, TN)
[3]Kemamine TM D-999: Tallowaminopropylamine (Humko Chemical Co., Memphis, TN)
[4]Sherex TM A-240: Ditallowamine (Sherex Chemical Co., Inc., Dublin, OH)
[5]Weight % based on weight of polyamide.
[6]UNI-REZ TM 2636 (Union Camp Corp., Wayne, NJ)
[7]Polyamide of Example 3.

TABLE 2

| Sample | Viscosity[1] cps @ 190° C. | Soft Point[1] °C. | Gel Time[2] Minutes |
|---|---|---|---|
| 1 | 7160 | 135 | — |
| 2 | 7160 | 135 | 3.1 |
| 3 | 1200 | 132 | 2.0 |
| 4(a) | 3750 | 130 | 2.2 |
| 4(b) | 2155 | 126 | 3.1 |
| 4(c) | 1280 | 127 | 2.6 |
| 5(a) | 1870 | 126 | 2.8 |
| 5(b) | 1450 | 126 | 2.2 |

TABLE 2-continued

| Sample | Viscosity[1] cps @ 190° C. | Soft Point[1] °C. | Gel Time[2] Minutes |
|---|---|---|---|
| 6(a) | 5040 | 134 | 6.1 |
| 6(b) | 3030 | 132 | 6.2 |
| 6(c) | 2360 | 133 | 6.4 |

[1]Measurements taken prior to addition of epoxy curing agent (D.E.N. 439).
[2]Measurements taken after addition of epoxy curing agent (D.E.N. 439).

TABLE 3

| | 23° C. | | | | 60° C. | | | |
|---|---|---|---|---|---|---|---|---|
| Sample | Modulus, psi | Break Stress psi | Break Strain % | Break Energy ft-lbs | Modulus, psi | Break Stress psi | Break Strain % | Break Energy ft-lbs |
| 1(a) | 4837 | 318 | 512 | 1.33 | 336 | 70 | 138 | 0.07 |
| 1(b) | 6039 | 260 | 134 | 0.45 | 433 | 32 | 56 | 0.02 |
| 2 | 4760 | 931 | 598 | 3.34 | 317 | 314 | 443 | 0.76 |
| 3 | 5858 | 661 | 430 | 1.98 | 138 | 139 | 235 | 0.18 |
| 4(a) | 2204 | 1545 | 431 | 3.45 | 257 | 352 | 273 | 0.51 |
| 4(b) | 1813 | 1543 | 313 | 2.42 | 272 | 350 | 198 | 0.34 |
| 4(c) | 2030 | 1690 | 269 | 2.34 | 253 | 337 | 156 | 0.28 |
| 5(a) | 1823 | 1679 | 291 | 2.52 | 254 | 363 | 161 | 0.32 |
| 5(b) | 2690 | 1420 | 215 | 1.71 | 360 | 243 | 104 | 0.14 |
| 6(a) | 4492 | 856 | 723 | 3.72 | 187 | 314 | 740 | 1.31 |
| 6(b) | 3368 | 880 | 787 | 4.38 | 225 | 263 | 655 | 1.09 |
| 6(c) | 4775 | 750 | 743 | 4.14 | 291 | 237 | 634 | 0.93 |

EXAMPLE 7

Comparative Epoxy-Cured Polyamide

Fifty grams of UNI-REZ 2636 were placed into a metal container. The metal container was put into an oven preheated to a temperature of 190° C. The container was removed when the polyamide became molten. Five grams of epoxy resin (D.E.N. 438) were immediately and thoroughly mixed into the polyamide. The resulting molten mixture was poured onto release paper and allowed to cool. Tensile tests were conducted according to the procedures of Example 2 (Table 4).

EXAMPLE 8

Epoxy-Cured Polyamide with Tallowamine

The procedure of Example 7 was followed, with the exception that 10% by weight (based on the polyamide) of Kemamine TM P-970 were added to the polyamide prior to placing the metal container in the preheated oven. Tensile test results may be found in Table 4.

EXAMPLE 9

Epoxy-Cured Polyamide with Ditallowamine

The procedure of Example 7 was followed, with the exception that 10% by weight (based on the polyamide) of Sherex TM A-240 were added to the polyamide prior to placing the metal container in the preheated oven. Tensile test results may be found in Table 4.

EXAMPLE 10

Epoxy-Cured Polyamide with Dimer/Diamine

The procedure of Example 7 was followed, with the exception that 10% by weight (based on the polyamide) of dimer/diamine were added to the polyamide prior to placing the metal container in the preheated oven. Tensile test results may be found in Table 4.

EXAMPLE 11

Epoxy-Cured Polyamide with Stearyl Stearamide

The procedure of Example 7 was followed, with the exception that 10% by weight (based on the polyamide) of Kemamide TM S-180 (Humko Chemical Company, Memphis, Tenn.) were added to the polyamide prior to placing the metal container in the preheated oven. Tensile test results may be found in Table 4.

EXAMPLE 12

Epoxy-Cured Polyamide with Stearyl Stearate

The procedure of Example 7 was followed, with the exception that 10% by weight (based on the polyamide) of Lexol-SS TM (Inolex Chemical Company, Philadelphia, Pa.) were added to the polyamide prior to placing the metal container in the preheated oven. Tensile test results may be found in Table 4.

EXAMPLE 13

Epoxy-Cured Polyamide with Ethylene Bisstearamide

The procedure of Example 7 was followed, with the exception that 10% by weight (based on the polyamide) of Kemamide TM W-40 (Humko Chemical Division, Memphis, Tenn.) were added to the polyamide prior to placing the metal container in the preheated oven. Tensile test results may be found in Table 4.

TABLE 4

| | 23° C. | | | | 60° C. | | | |
|---|---|---|---|---|---|---|---|---|
| Sample | Modulus, psi | Break Stress psi | Break Strain % | Break Energy ft-lbs | Modulus, psi | Break Stress psi | Break Strain % | Break Energy ft-lbs |
| 7 | 3465 | 1231 | 706 | 4.93 | 265 | 322 | 667 | 1.24 |
| 8 | 4052 | 1164 | 353 | 2.37 | 281 | 365 | 452 | 0.89 |
| 9 | 2148 | 1539 | 586 | 4.37 | 327 | 289 | 788 | 1.34 |
| 10 | 4485 | 1205 | 217 | 1.67 | 516 | 299 | 144 | 0.24 |
| 11 | 4945 | 1140 | 719 | 4.71 | 549 | 311 | 814 | 1.43 |
| 12 | 6511 | 1182 | 767 | 5.45 | 311 | 298 | 713 | 1.28 |
| 13 | 9438 | 1296 | 634 | 4.95 | 1560 | 442 | 724 | 1.95 |

EXAMPLE 14
Vinyl T-Peel Tests

A vinyl peel test as described below was performed on samples from Examples 1, 2, 3, 4(a) and 4(c). Vinyl strips were cut to a size of approximately 1.5 inches by 7 inches. A thin layer of the molten polyamide/epoxy mixture covering an area of approximately 1 inch by 6 inches was applied to one warmed vinyl strip, using a typical draw-down bar. A second warmed vinyl strip was then placed on top of the molten adhesive layer and pressure was applied to the bonded area by a hand roller, whereby the weight of the roller itself supplied the pressure on the bonded area. The adhesive was allowed to cure for one week, after which time the vinyl strips were separated using an apparatus capable of measuring the pressure required to separate the bonded strips (Table 5).

EXAMPLE 15
Lap Shear Strength

The samples prepared in Examples 1, 2 and 6(b) were tested for lap shear strength according to the method described below.

The molten polyamide/epoxy mixtures were used to bond different substrates having smooth surfaces, including wood, polystyrene and polycarbonate. The substrate samples were 1 inch wide by 4 inches long by ⅛ inch thick. The molten adhesive was placed on one substrate surface which was at ambient temperature. Another substrate was placed on top of the adhesive-coated surface and pressed together by finger pressure to give a bonded area of about 1 square inch. After approximately 5 minutes, the substrates were flexed by hand to determine if the bonded substrates exhibited sufficient bond strength so as not to separate or slip. All of the adhesive samples tested exhibited such bond strength.

The samples were then allowed to set one week at ambient temperature to complete cure. After cure was complete, one set of bonded substrates were placed in room-temperature water to determine water resistance. After soaking in water for one hour, the samples were flexed by hand to determine bond strength as above. The samples were replaced in the water and tested daily over a one-week period for bond strength. Only sample 1 exhibited weakened bond strength as a result of submersion in water.

Another set of samples were tested for lap shear strength by separating the bonded substrates with an apparatus capable of measuring the pressure required to separate the bonded substrates (Table 6).

TADLE 5

| Sample | VINYL T-PEEL Viscosity,[1] cps @ 190° C. | Vinyl T-peel, psi |
|---|---|---|
| 1 | 7160 | 26.2 |
| 2 | 7160 | 42.3 |
| 3 | 1200 | 10.4 |
| 4(a) | 3750 | 38.9 |
| 4(c) | 1280 | 32.2 |

[1]Measurement taken prior to addition of epoxy curing agent (D.E.N. 439).

TABLE 6

| Sample | Lap Shear Strength Substrate | Lap Shear, psi |
|---|---|---|
| 1 | Pine | 341 |
| 2 | Pine | 354 |
| 6(b) | Pine | 537 |
| 1 | Polystyrene | 76 |
| 2 | Polystyrene | 165 |
| 6(b) | Polystyrene | 136 |
| 1 | Polycarbonate | 188 |
| 2 | Polycarbonate | 281 |
| 6(b) | Polycarbonate | 236 |

What is claimed is:

1. A thermoset adhesive composition, comprising:
   (a) a thermoplastic, substantially amine-terminated polyamide resin having an amine plus acid number greater than about 1 and less than about 50 and having an excess of free amine to acid groups, said polyamide resin comprising the reaction product of:
   a polymerized fatty acid,
   at least one acid selected from the group consisting of a linear dicarboxylic acid and a monocarboxylic acid; and
   at least one polyamine selected from the group consisting of linear, branched and cyclic polyamines;
   (b) a diluent, distinct from and not a part of the polymer structure of said polyamide resin, which is selected from the group consisting of dimer diamine, $RNH_2$, $RNHCH_2CH_2CH_2NH_2$ and $R-X-R'$ wherein R and R' are any $C_{14}-C_{24}$ aliphatic hydrocarbons, and X is selected from the group consisting of

(c) an epoxy resin having at least two epoxy groups per molecule of epoxy resin;
   said adhesive composition comprising a ratio of epoxy groups to free amine groups of greater than 1:1 and less than about 10:1 and a weight ratio of said polyamide resin to said diluent of from about 100:1 to about 4:1.

2. The composition of claim 1 wherein the polyamide resin comprises the reaction product of 30–100 equivalent percent of said polymerized fatty acid, 0–70 equivalent percent of said 6 to 22 carbon atom linear dicarboxylic acid, 0–10 equivalent percent of said 2 to 22 carbon atom monocarboxylic acid, and 100–120 equivalent percent of 2 to 60 carbon atom polyamine selected from the group consisting of linear, branched, and cyclic polyamines.

3. The composition of claim 2 wherein the polymerized fatty acid has a dimeric fatty acid content greater than 65 percent by weight.

4. The composition of claim 3 wherein the linear dicarboxylic acid is selected from the group consisting of oxalic, malonic, succinic, suberic, adipic, azelaic, sebacic, and dodecanedioic acids.

5. The composition of claim 4 wherein the linear dicarboxylic acid is selected from the group consisting of adipic, azelaic, sebacic, and dodecanedioic acids.

6. The composition of claim 3 wherein the monocarboxylic acid is selected from the group consisting of stearic, tall oil fatty and oleic acids.

7. The composition of claim 3 wherein the polyamine is selected from the group consisting of diaminopropane, diaminobutane, diaminopentane, methylpentamethylenediamine, methylnonanediamine, diethylenetriamine, triethylenetetraamine, tetraethylenepentaamine, piperazine, dipiperazine, aminoethylpiperazine, bis(aminoethyl)piperazine, dimer diamine, polyetherdiamine, xylenediamine, bis(aminomethyl)benzene, bis(aminomethyl)cyclohexane, ethylenediamine, and hexamethylenediamine.

8. The composition of claim 7 wherein the polyamine is selected from the group consisting of ethylenediamine, hexamethylenediamine, piperazine, methylpentamethylenediamine, dimer diamine, and polyetherdiamine.

9. The composition of claim 1 wherein the epoxy resin has from about 2.2 to eight epoxy groups per molecule of epoxy resin.

10. The composition of claim 1 wherein the polyamide resin has an amine plus acid number greater than about 2 and less than about 30.

11. The composition of claim 1 wherein the polyamide resin has an amine plus acid number greater than about 2 and less than about 20.

12. The composition of claim 1 wherein the ratio of epoxy groups to free amine groups is greater than about 1.5:1 and less than about 5:1.

13. The composition of claim 1 wherein the weight ratio of polyamide resin to diluent is from about 35:1 to about 6:1.

14. The composition of claim 1 wherein the diluent has a molecular weight of from about 200 to 900.

15. The composition of claim 1 wherein the diluent is selected from the group consisting of tallowamine, ditallowamine, di(hydrogenatedtallow)amine, tallowaminopropylamine, dimer diamine, stearyl stearamide, ethylene bisstearamide, and stearyl stearate.

16. The composition of claim 1 wherein:

said linear dicarboxylic acid is selected from the group consisting of oxalic, malonic, succinic, suberic, adipic, azelaic, sebacic, and dodecanedioic acids;

said monocarboxylic acid is selected from the group consisting of stearic, tall oil fatty and oleic acids;

said polyamine is selected from the group consisting of diaminopropane, diaminobutane, diaminopentane, methylpentamethylene-diamine, methylnonanediamine, diethylenetriamine, triethylenetetraamine, tetraethylenepentaamine, piperazine, dipiperazine, aminoethylpiperazine, bis(aminoethyl)piperazine, dimer diamine, polyetherdiamine, xylenediamine, bis(aminomethyl)benzene, bis(aminomethyl)cyclohexane, ethylenediamine, and hexamethylenediamine; and said polymerized fatty acid has a dimeric fatty acid content greater than 65 percent by weight.

17. The composition of claim 16 wherein the epoxy resin has from about 2.2 to eight epoxy groups per molecule of epoxy resin.

* * * * *